April 18, 1950    E. M. DAUGERT    2,504,812
SYNCHRONOUS MOTOR STARTING CONTROL
Filed Jan. 29, 1948
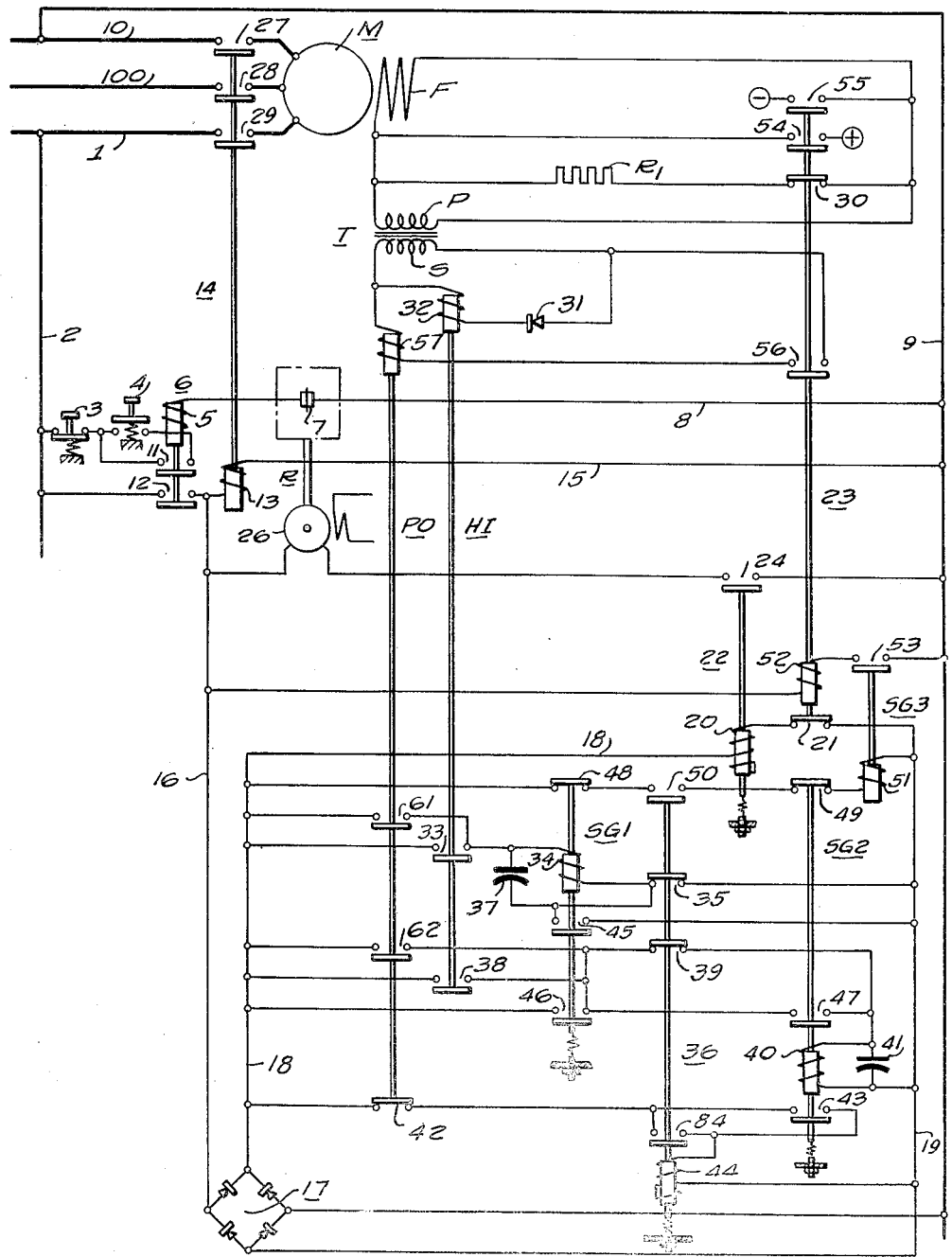
WITNESSES:
INVENTOR
Emilion M. Daugert.
BY
ATTORNEY Patented Apr. 18, 1950

2,504,812

UNITED STATES PATENT OFFICE 2,504,812

SYNCHRONOUS MOTOR STARTING CONTROL

Emilian M. Daugert, Upper Darby, Pa., assignor to Westinghouse Electric Corporation, East Pittsburgh, Pa., a corporation of Pennsylvania Application January 29, 1948, Serial No. 5,076

5 Claims. (Cl. 318—176)

My invention relates to electric systems of control for automatically starting, accelerating, synchronizing and, in the event of pull-out, resynchronizing synchronous motors.

It is well known and usual practice to start a synchronous motor as an induction motor on the damper winding and at the balancing speed, the maximum induction motor speed, to transfer the motor from induction motor operation to synchronous motor operation by exciting the field winding. Various automatice control systems are well known in the art for this general purpose. With most of such automatic starting control systems, no provision is made to eliminate the undesirable surge that is occasioned when the field excitation is applied and such application of the field excitation takes place, as is usually the case, at an instant when the pole pieces are not in the most favorable position with reference to the rotating magnetic flux produced by the alternating current in the armature windings of the motor.

I am aware that others have proposed to control the instant of excitation of the synchronous motor field winding so as to obtain a maximum pull-in torque, and, in consequence, also a minimum of the electrical surge of current in the armature winding and also a minimum of mechanical shock to the motor and the mechanical load that is usually coupled to the motor.

Such prior art devices, however, were not capable of accurately, within a very few degrees, selecting the correct angular position of the pole pieces with reference to the rotating flux and the structure of the armature winding.

It is, therefore, a broad object of my invention to provide for effectively controlling the time of excitation of the field winding with reference to the rotating flux in the stator.

Another object of my invention is the accurate selection of the time of energization of the field winding to obtain maximum pull-in torque at synchronization of the motor.

It is an important and somewhat more specific object of my invention to select a particular point of a particular slip cycle of a synchronous motor for the excitation of the field windings with direct current in such a manner as to provide a given polarity on given pairs of alternate poles.

The objects hereinbefore stated are merely illustrative of the objects of my invention. Many other objects and advantages will become more apparent from a study of the following specification and the drawing in which the single figure is a diagrammatic showing of an embodiment of my system of control.

In the drawing, M designates the synchronous motor, the starting operation of which is to be controlled. The energization of the motor field winding F is controlled by the field contactor 23 and the connection of the motor M to the alternating-current buses 1, 10 and 100 is controlled by the line contactor 14.

The field is provided with a discharge circuit including a discharge resistor $R_1$ and also the primary winding P of the transformer T. This transformer T through its secondary winding is interconnected with a frequency relay HI and a pull-out relay PO. The frequency relay HI controls the deenergization of a control relay SG1 which in turn controls the deenergization of another control relay SG2 similar to the control relay SG1.

The characteristics of the frequency relay HI in conjunction with the control relay SG1, which has its coil shunted by an adjustable capacitor 37, are so selected that the SG1 relay will drop out at a selected per cent slip of the synchronous motor. The second control relay SG2 also being provided with capacitor timing and being subject to the drop out of control SG1 drops out when a given point on the pole pieces of the field winding of a given polarity holds a given position with reference to a point on the rotating wave of flux in the armature or primary structure of the synchronous motor.

The SG1 relay through a set-up relay SG3 controls the field contactor 23 and thus controls the excitation of the field winding F with direct current.

A more accurate understanding of my invention can very likely be had by a study of a typical starting cycle.

Assuming that the alternating-current buses 1, 10, and 100 are energized and the source of direct current for the field is also available and it is desired to start the motor, then the attendant actuates the starting push button 4, whereupon a circuit is established from bus 1 through conductor 2, the stop push button 3, the start push button 4, the actuating coil 5 of the low voltage relay 6, contact 7 of the incomplete sequence time relay R, conductors 8 and 9 to the alternating-current bus 10. The low voltage relay 6 holds itself in through-contacts 11, and through-contacts 12 energizes conductor 16. Energization of conductors 16 and 9 thus provides alternating-current potential to the full-wave rectifier 17 to thus supply the buses 18 and 19 with direct-current energy. Energization of conductors 16 and 9 also establishes a circuit for the line contactor 14 by the circuit from conductor 16 through coil 13 and conductor 15 to conductor 9. Operation of the line contactor 14 closes the contacts 27, 28 and 29 to connect the primary or armature winding of the motor to the alternating-current buses 1, 19, and 100 to thus start the motor on its damper winding as an induction motor.

The energization of buses 18 and 19 with direct current establishes a circuit from conductor 18 through actuating coil 20 of the time limit relay 22 and back contacts 21 on the field contactor 23 to the bus 19. The time limit contactor 22 almost instantly closes its contacts 24 to thus energize the motor 26 of the incomplete sequence timing relay R.

While the motor M is accelerating as an induction motor, an alternating current induced in the field winding F traverses the discharge circuit of the field which includes the resistor $R_1$ and contacts 30 and the transformer primary winding P. The transformer secondary winding S supplies energization for the frequency relay HI through the rectifier 31 and the actuating coil 32. This relay, since it is thus energized by a pulsating direct current where the pulsations have a frequency proportional to the per cent slip, will start to vibrate when the time periods between successive direct-current pulsations are sufficiently long to cause the armature of the frequency relay to drop.

At the instant of starting, the current in coil 32 causes the HI relay to pick up to close the contacts 33 and 38. By this operation a circuit is established from the direct-current bus 18 through contact 33, actuating coil 34, back contact 35 of the time limit relay 36 to the bus 19. The closure of the contact 38 establishes a circuit from conductor or bus 18 through contacts 38, contacts 39 of the time limit relay 36, actuating coil 40 of the control relay SG2 to the bus 19. A capacitor 37 shunts the actuating coil 34 and a similar capacitor 41 shunts the actuating coil 40. These two relays SG1 and SG2 are similar in every respect, except that the adjustment of the capacitors may be and usually will be different, since these relays will be required to operate in different time intervals by the capacitor timing these capacitors provide.

The control relay SG1 holds itself in through-contacts 45 but the control relay SG2 does not hold itself in directly by its own action but is held in by the closure of both the contacts 46 on the control relay SG1 and the contacts 47 on the control relay SG2. It is thus apparent that the sequence of operation must of necessity be, first, control relay SG1 and, second, control relay SG2.

Further, the control relay SG1 holds itself in during vibration of the frequency relay HI, by reason of the capacitor timing of the capacitor 37 connected in shunt relation to the coil 34, until the open circuit time at contacts 33 is sufficiently long to cause SG1 to drop out.

The control relay SG2 has a similar capacitor timing circuit but it is not directly subject to any timing from the frequency relay HI and the capacitor 41 connected in shunt relation to coil 40 and the capacitor and coil 40 both remain energized until SG1 drops to remove the by-pass contacts 46 from across the frequency relay contacts 38. It is thus apparent that the sequence of operation must of necessity be, first, SG1 control relay and then, second, SG2 control relay.

After operation of the control relay SG2, a circuit is established from bus 18 through the back contacts 42 of the pull-out relay PO, contacts 43, actuating coil 44 of the time limit relay 36 to the bus 19. The time limit relay 36 holds itself in through the closure of contacts 64 and its energized or actuated position is thus independent of the position of contacts 43.

The operation of the control relays SG1 and SG2 causes the opening of the contacts 48 and 49. From this operation, it will be apparent that the control relay SG3, having actuating coil 51, can only become energized when both contacts 48 and 49 are closed and contacts 50 are closed. At the time the time limit relay 36 picks up to close contact 50, contacts 48 and 49 are, of course, open. When the synchronous motor has attained very near its balancing speed which may be from 95 to 97% of the synchronous speed, the frequency relay HI drops out to open contacts 33 to deenergize the coil 34. The contacts 33 may even chatter once or twice, but the adjustment of the capacitor 37 is such that the control relay SG1 drops out at a selected per cent slip, as, for instance, a 3% slip. When the frequency relay drops out, contacts 38 are also opened, and an instant later, when contacts 46 open, the circuit for the actuating coil 40 of the control relay SG2 is interrupted. The adjustment of capacitor 41 with reference to the coil 40 is such that the control relay SG2 drops out with just the delay to close contacts 49 when a given point on the pole piece of the synchronous motor of a given polarity holds a given position with reference to a given point on the rotating wave of flux in the armature winding. From this, it is apparent that contact 49 controls the energization of the actuating coil 49 of the set-up relay SG3 at a time when the rotating structure of the motor holds the above-mentioned position with reference to the rotating field.

Operation of the set-up relay SG3 closes the contacts 53, whereupon the actuating coil 52 of the field contactor 23 is energized. Operation of the field contactor causes the closing of contacts 54 and 55 and an instant later the opening of contacts 30. Operation of the field contactor also closes the contacts 56 to connect the actuating coil 57 of the pull-out relay to the secondary of the transformer T. The time constants of both the field contactor 23 and the set-up relay SG3 are extremely small, but can be accurately selected so that, when the field contactor 23 eventually closes, the contacts 54 and 55 to energize the field winding F with direct current, the energization will take place at an instant when the pole pieces hold such a position with reference to the rotating flux in the armature structure that the motor pulls in with maximum pull-in torque.

Even with the most favorable synchronizing conditions, some current surge is produced in the field winding and it may happen that such current surge in the coil 57 of the pull-out relay is sufficient to cause the opening of contacts 42 and the closing of contacts 61 and 62. The time delay of the time limit relay 36, however, is sufficient to prevent opening of contacts 50 until synchronization is complete. Of course, after the synchronization is complete, no current will flow in the actuating coil 57 and, in consequence, the contacts 42 will remain closed.

In the event of loss of synchronous operation of the motor, by reason of overload or for any other reason that may cause a pull-out, a current surge is produced in the coil 57 of the pull-out relay and, in consequence, contacts 42 are opened to deenergize the time limit relay 36 which thus opens the contacts 50. Opening of contacts 50 causes the opening of contacts 53 for the circuit of the actuating coil of the field contactor and as a result, the direct-current excitation is removed from the field winding F. The motor thus again operates as an induction motor to instantly establish the conditions for resynchronization. The closure of contacts 61 and 62 again effects the energization of the control relays SG1 and SG2 in the order named. An instant after the surge of current has ceased through the actuating coil 57, contacts 33 and 38 are closed by the frequency relay. The energization of the control relays SG1 and SG2 thereafter is independent of the pull-out torque. Synchronization, therefore, proceeds in exactly the same manner after a pull-out, as during starting of the motor from rest.

While I have shown and described but a single embodiment of my invention, I realize that others, particularly after having had the benefit of the teachings of my invention, may devise similar systems of control for the same general purpose. I, therefore, do not wish to be limited to the details of the particular showing of my invention.

I claim as my invention:

1. In a synchronous motor starting control scheme of the type described, the combination of a synchronous motor having an armature, or primary, winding and a field winding, a plurality of terminal leads normally energized with alternating current, a pair of terminal leads normally energized with direct current, a contactor for connecting the armature winding to the terminals energized with alternating current, a field contactor for connecting the field winding to the terminals energized with direct current, and a control system for controlling the operation of the field contactor, said control system comprising an energized control circuit, a frequency relay interconnected with the field winding to be energized with the alternating current induced in said field winding while said motor operates as an induction motor during starting, switching means operable by said frequency relay, a control relay, having switch contacts and having a coil and having a capacitor connected in parallel to said coil to accurately select, by capacitor timing, the instant of operation of the relay after the coil and capacitor are deenergized by the opening of said switching means by the operation of the frequency relay, the adjustment of the capacitor and the operating characteristics of the frequency relay as it opens said switching means for longer and longer intervals of time as the motor approaches synchronous speed being so selected that the control relay operates at an instant when the motor is at a selected per cent of synchronous speed, a second control relay similar to the first controlled in its operation by the interconnection effected with said control circuit by the position of the switch contacts operated by the first control relay, the capacitor of the second control relay being so adjusted with reference to the coil of the second control relay that the second control relay operates with sufficient delay after the closing of said switch contacts that a given pole of the synchronous motor holds a given position with reference to a given point on the rotating flux wave in the armature winding, and means operable by the second control relay for effecting the operation of the field contactor.

2. In a synchronous motor starting control scheme of the type described, the combination of a synchronous motor having an armature, or primary, winding and a field winding, a plurality of terminal leads normally energized with alternating current, a pair of terminal leads normally energized with direct current, a contactor for connecting the armature winding to the terminals energized with alternating current, a field contactor for connecting the field winding to the terminals energized with direct current, and a control system for controlling the operation of the field contactor, said control system comprising, an energized control circuit, a control relay connected to the control circuit and having switch contacts to be operated thereby and having a coil and a capacitor of a given selected capacity connected in parallel to the coil to accurately select, by capacitor timing, the instant of operation of the relay after the coil and capacitor are deenergized, a frequency relay, switching means operable by said frequency relay for deenergizing said control relay by operation of said switching means to disconnect said control relay from said control circuit, said frequency relay being interconnected with the field winding to be energized with the alternating current induced in the field winding while said motor is operating as an induction motor during starting, the combined characteristics of the control relay and frequency relay being such that the control relay functions at an instant when the motor operates at a selected slip, and a second control relay similar to the first controlled in its connection to the control circuit by the switch contacts and having its capacitor timing so adjusted that the second control relay will operate with sufficient delay after the opening of the switch contacts to thus effect the operation of the field contactor at an instant when the field winding holds a selected angular position with reference to the rotating flux in the armature winding.

3. In a synchronous motor starting control scheme of the type described, the combination of a synchronous motor having an armature, or primary, winding and a field winding, a plurality of terminal leads normally energized with alternating current, a pair of terminal leads normally energized with direct current, a contactor for connecting the armature winding to the terminals energized with alternating current, a field contactor for connecting the field winding to the terminals energized with direct current, and a control system for controlling the operation of the field contactor, said control system comprising, an energized control circuit, a control relay connected to the control circuit having switch contacts operated thereby and having a coil and a capacitor of a given selected capacity connected in parallel to the coil to accurately select, by capacitor timing, the instant of operation of the relay after the coil and capacitor are deenergized, a frequency relay, switching means operable by said frequency relay for deenergizing said control relay by operation of said switching means to disconnect said control relay from said control circuit, said frequency relay being interconnected with the field winding to be energized with the alternating current induced in the field winding while said motor is operating as an induction motor during starting, the combined characteristics of the control relay and frequency relay being such that the control relay functions at an instant when the motor operates at a selected slip, a set-up relay having a switch for connecting the field contactor to the control circuit to thus effect the operation of the field contactor and a second control relay similar to the first controlled in its connection to the control circuit by the said switch contacts and having its capacitor timing so adjusted that the second control relay will operate with sufficient delay after the opening of the switch contacts to thus effect the operation of the set-up relay and thus the field contactor at an instant when a given point on a given pole piece carrying a field winding holds a given position with reference to a given point on a rotating flux wave in the armature winding.

4. In a synchronous motor starting control scheme of the type described, the combination of a synchronous motor having an armature, or primary, winding and a field winding, a plurality of terminal leads normally energized with alternating current, a pair of terminal leads normally energized with direct current, a contactor for connecting the armature winding to the terminals energized with alternating current, a field contactor for connecting the field winding to the terminals energized with direct current, and a control system for controlling the operation of the field contactor, said control system comprising, an energized control circuit, a control relay connected to the control circuit having switch contacts operated thereby and having a coil and a capacitor of a given selected capacity connected in parallel to the coil to accurately select, by capacitor timing, the instant of operation of the control relay after the coil and capacitor are deenergized, a frequency relay, switching means operable by the frequency relay whereby said frequency relay upon drop-out disconnects the control relay from the control circuit and thus deenergizes the coil and capacitor of the control relay, said frequency relay having a coil, and rectifier connected in series therewith, connected to the field winding whereby the coil of the frequency relay is energized by pulsations of direct current the frequency of which varies with the per cent slip, the characteristics of the control relay and frequency relay combination being so selected that the control relay drops out at a selected low per cent slip, and a second control relay similar to the first having its coil and capacitor controlled in its connection to the control circuit by the said switch contacts and having its capacitor timing so adjusted that the second control relay will operate with a sufficient delay after the opening of the switch contacts that the field winding and rotating flux in the armature winding have a selected angular relation, and means responsive to the drop-out of the second control relay for effecting the operation of the field contactor.

5. In a synchronous motor starting control scheme of the type described, the combination of a synchronous motor having an armature, or primary, winding and a field winding, a plurality of terminal leads normally energized with alternating current, a pair of terminal leads normally energized with direct current, a contactor for connecting the armature winding to the terminals energized with alternating current, a field contactor for connecting the field winding to the terminals energized with direct current, and a control system for controlling the operation of the field contactor, said control system comprising, an energized control circuit, a control relay connected to the control circuit having switch contacts operated thereby and having a coil and a capacitor of a given selected capacity connected in parallel to the coil to accurately select, by capacitor timing, the instant of operation of the control relay after the coil and capacitor are deenergized, a frequency relay, switching means operable by the frequency relay whereby said frequency relay upon drop-out disconnects the control relay from the control circuit and thus deenergizes the coil and capacitor of the control relay, said frequency relay having a coil, and rectifier connected in series therewith, connected to the field winding whereby the coil of the frequency relay is energized by pulsations of direct current the frequency of which varies with the per cent slip, the characteristics of the control relay and frequency relay combination being so selected that the control relay drops out at a selected low per cent slip, and a second control relay similar to the first having its coil and capacitor deenergized by the drop-out and thus the opening of said switch contacts of the first control relay, the capacitor timing of the second control relay being so adjusted that the second control relay drops out with just the right time delay after opening of the switch contacts that the field winding and rotating flux in the armature winding have a selected angular relation, and means responsive to the drop-out of the second control relay for effecting the operation of the field contactor, and a pull-out relay connected to the field winding by the field contactor, said pull-out relay being energized upon loss of synchronism of the motor to reset the system of control to resynchronize the motor.

EMILIAN M. DAUGERT.

REFERENCES CITED

The following references are of record in the file of this patent:

UNITED STATES PATENTS

| Number | Name | Date |
| --- | --- | --- |
| 2,444,253 | Heumann et al. | June 28, 1948 |